(12) United States Patent
Thomas et al.

(10) Patent No.: US 8,132,198 B2
(45) Date of Patent: Mar. 6, 2012

(54) POINT-OF-SALE ENABLEMENT OF OPTICAL STORAGE MEDIA

(75) Inventors: Fred C. Thomas, Fort Collins, CO (US); Philip M. Walker, Fort Collins, CO (US); Mark T. Maguire, Loveland, CO (US); Kerwyn L. Ballinger, Fort Collins, CO (US); Makarand P. Gore, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 37 days.

(21) Appl. No.: 12/797,984

(22) Filed: Jun. 10, 2010

(65) Prior Publication Data
US 2010/0251276 A1    Sep. 30, 2010

Related U.S. Application Data

(62) Division of application No. 11/669,757, filed on Jan. 31, 2007, now abandoned.

(51) Int. Cl.
*G11B 7/24* (2006.01)
*E05B 73/00* (2006.01)

(52) U.S. Cl. .................................. 720/719; 70/57.1
(58) Field of Classification Search ............... 720/718, 720/719; 503/200; 70/57.1
See application file for complete search history.

(56) References Cited

U.S. PATENT DOCUMENTS

| | | | |
|---|---|---|---|
| 5,077,921 A | 1/1992 | Mooney | |
| 5,078,266 A | 1/1992 | Rackley | |
| 5,503,328 A | 4/1996 | Roccaforte et al. | |
| 5,513,169 A * | 4/1996 | Fite et al. | 720/718 |
| 5,788,075 A | 8/1998 | Wrabel | |
| 6,082,156 A | 7/2000 | Bin | |
| 6,267,239 B1 | 7/2001 | Maki | |
| 6,328,160 B1 | 12/2001 | Cooksey | |
| 6,434,109 B2 * | 8/2002 | Rollhaus et al. | 369/286 |
| 6,547,066 B2 | 4/2003 | Koch | |
| 6,633,853 B2 * | 10/2003 | Oshima et al. | 705/57 |
| 6,681,928 B1 | 1/2004 | Siek et al. | |
| 6,775,839 B1 * | 8/2004 | O'Brien | 720/718 |
| 6,955,068 B2 | 10/2005 | Gelardi | |
| 6,981,587 B2 | 1/2006 | Gerrie | |
| 7,086,073 B2 * | 8/2006 | Benedikt et al. | 720/719 |
| 7,203,969 B2 * | 4/2007 | Sakurai et al. | 726/34 |
| 7,318,524 B2 | 1/2008 | Compton et al. | |
| 7,653,919 B2 * | 1/2010 | Potyrailo et al. | 720/718 |
| 7,665,103 B2 * | 2/2010 | Usami et al. | 720/725 |
| 7,802,274 B2 * | 9/2010 | Wisnudel et al. | 720/718 |
| 8,057,886 B2 * | 11/2011 | Wisnudel et al. | 428/209 |
| 2004/0054594 A1 * | 3/2004 | Forster et al. | 705/18 |
| 2004/0129039 A1 | 7/2004 | Reetz et al. | |
| 2005/0150792 A1 | 7/2005 | Bolognia et al. | |
| 2005/0160774 A1 | 7/2005 | Weinstein et al. | |
| 2006/0114755 A1 * | 6/2006 | Eklund | 369/13.01 |
| 2006/0136947 A1 * | 6/2006 | LeBlanc et al. | 720/619 |
| 2006/0227696 A1 * | 10/2006 | Smith et al. | 369/275.1 |
| 2007/0116988 A1 * | 5/2007 | Wisnudel et al. | 428/817 |
| 2007/0140072 A1 * | 6/2007 | Agrawal et al. | 369/14 |
| 2007/0143774 A1 * | 6/2007 | Agrawal et al. | 720/738 |
| 2008/0012707 A1 * | 1/2008 | Peters et al. | 340/568.1 |
| 2008/0018886 A1 * | 1/2008 | Wisnudel et al. | 356/237.1 |

(Continued)

Primary Examiner — Brian Miller

(57) ABSTRACT

An apparatus includes an optical data storage medium comprising a longitudinal portion at a resting location and a counterweight attached to the optical data storage medium. Unless the longitudinal portion is locked in place, the counterweight causes the longitudinal portion to move from the resting location when the optical data storage medium is rotated thereby rendering at least some data on the optical data storage medium unusable.

6 Claims, 4 Drawing Sheets

U.S. PATENT DOCUMENTS

2009/0215620 A1* 8/2009 Cella et al. .................... 503/200
2009/0285075 A1* 11/2009 Wisnudel et al. ............. 369/100
2010/0097223 A1* 4/2010 Kruest et al. ............... 340/572.1
2010/0258745 A1* 10/2010 Wisnudel et al. .......... 250/492.1

* cited by examiner

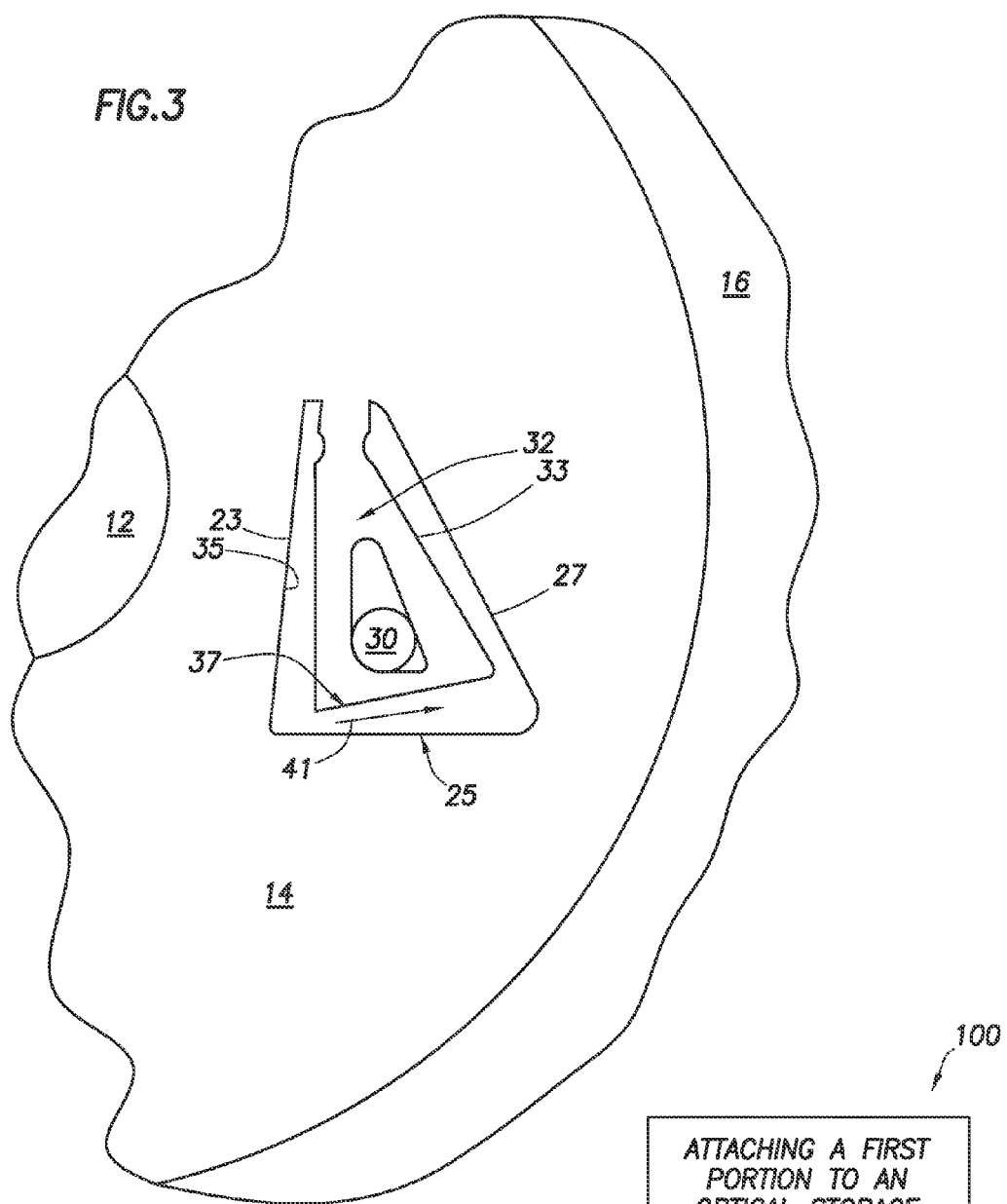
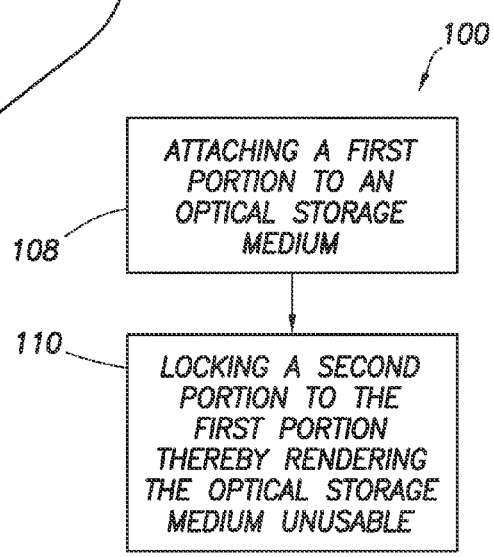

POINT-OF-SALE ENABLEMENT OF OPTICAL STORAGE MEDIA

CROSS REFERENCE TO RELATED APPLICATIONS

This application is a divisional of, and claims priority to, U.S. application Ser. No. 11/669,757, entitled "Point-of-Sale Enablement of Optical Storage Media," filed on 31 Jan. 2007 now abandoned.

BACKGROUND

Theft of optical storage media such as compact disc read-only memory (CD ROM) and digital video disc (DVD) media results in substantial losses for retailers of such media.

BRIEF DESCRIPTION OF THE DRAWINGS

For a detailed description of exemplary embodiments of the invention, reference will now be made to the accompanying drawings in which:

FIG. 3 illustrates an imbalance caused by the counterweight as the optical storage medium spins in accordance with various embodiments;

FIG. 10 shows a method in accordance with various embodiments.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The various embodiments described herein provide techniques for securing an optical storage medium such as a CD ROM or DVD. By securing the optical storage medium as described herein the medium is rendered unusable thereby providing a deterrent to theft. Equipment at the point-of-sale (POS) removes or defeats the security mechanism thereby rendering the medium usable to a lawful purchaser.

Figure 1:
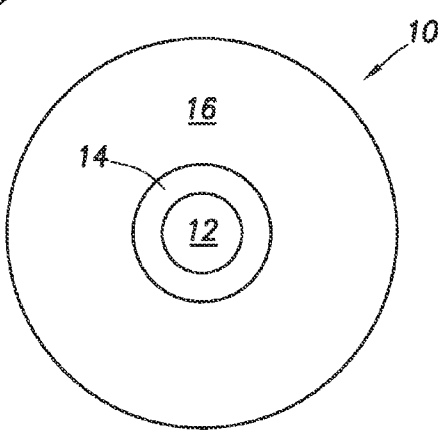
FIG. 1 shows an optical storage medium usable in conjunction with various embodiments.

FIG. 1 illustrates an optical storage medium 10 (also referred to as a "disc"). The optical storage medium 10 comprises a center hole 12 and a data region 14. Between the data region 14 and the center hole 12 is a region 14 in which data is not stored. In some embodiments region 14 is transparent. The optical storage medium 10 comprises polycarbonate or other suitable material.

Figure 2:
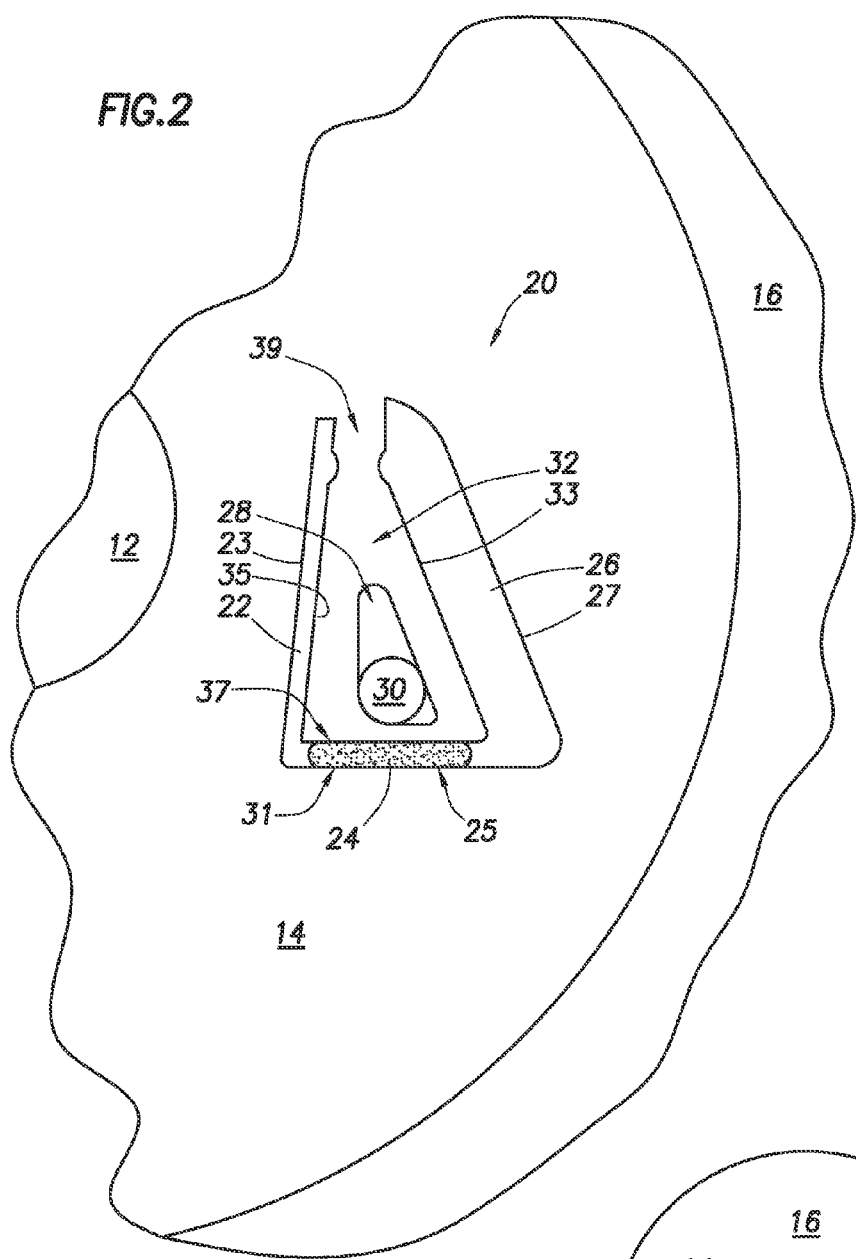
FIG. 2 shows a security mechanism comprising a counterweight on the optical storage medium in accordance with various embodiments.

FIG. 2 illustrates an embodiment in which the optical storage medium 10 comprises a security mechanism 20 formed in the non-data region 14. In other embodiments, the security mechanism 20 is provided in another region of the medium 10. In at least one embodiment, material comprising the storage medium 10 (i.e., polycarbonate) is absent in regions 22, 24 and 26 thereby forming a longitudinal portion 32. Due to its shape, the longitudinal portion 32 is also referred to as a "peninsula." The material that otherwise would fill regions 22, 24, and 26 may be removed (e.g., laser cut) after the storage medium is formed. In other embodiments, the peninsula 32 is formed while the storage medium 10 is being formed.

The peninsula 32 connects to the region 14 of the optical storage medium at a connecting region 39 as shown. The center region 28 of the peninsula 32 is devoid of storage medium material (polycarbonate) as well. A counterweight 30 is provided in the center region 28. The counterweight 30 comprises lead or other suitable material. The counterweight 30 may be provided in the form of a disk or sphere or other suitable shape. In at least some embodiments, the weight of the counterweight 30 is substantially equal to the weight of the storage medium material that otherwise would occupy regions 22, 24, and 26. For example, the weight of the counterweight 30 is within 10% of the weight of the storage medium material that otherwise would occupy regions 22, 24, and 26. The counterweight 30 is attached to the center region 28 of the security mechanism 20 by an adhesive, by press fitting the counterweight into the center region 28, or via another suitable mechanism.

The peninsula 32 generally comprises three edges 33, 35, and 37 as shown generally adjacent edges 27, 23, and 25 of the rotating storage medium 10 opposite regions 26, 22 and 24, respectively. The peninsula is a functional cantilever in some embodiments. The peninsula is held in place by hinge point 39 when no centrifugal force is applied (which otherwise would be applied during rotation of the optical storage medium. At the factory, an adhesive 31 is placed in region 24. In some embodiments, the adhesive 31 comprises a two-part adhesive (e.g., an epoxy). One part tills some or all of region 24. The other part of the adhesive is embedded in a micro-encapsulated form within the first part of the adhesive. That is, the second adhesive part is contained within multiple small spheres. The spheres in this and other embodiments are made of, for example, proteins, polysaccharides, starches, waxes, fats, natural and synthetic polymers or resins, etc. Each sphere also comprises metal filings or other material capable of rupturing the spheres from within when such material is resonated.

The first part of the adhesive has a relatively low, or no, bond strength. Prior to the point-of-sale (POS), the multipart adhesive is not mixed together and thus does not function as an adhesive. At the POS (or other desired time), the optical storage medium 10, and in particular, the security mechanism 20, is exposed to a magnetic field suitable to cause the metal filings within the spheres to resonate thereby breaking open the spheres and releasing the second adhesive part. At that point, the two parts of the adhesive mix together thereby forming the complete adhesive which has a bond strength much greater than the bond strength of the just the first adhesive part. Once the two parts of the adhesive mix together, the peninsula 32 is locked in place at the resting position shown in FIG. 2. That is, although centrifugal force on the counterweight 30 while the storage medium is spinning will tend to force the counterweight 30 and thus the peninsula 32 to the outer edge of the storage medium, the bond strength of the completed adhesive great enough to prevent the peninsula 32 from moving. Because the weight of the counterweight 30 is substantially equal to the weight of the storage medium material that otherwise would occupy regions 22, 24, and 26, once the peninsula is locked in place, the optical storage medium 10 remains balanced while it is spun at operating speeds to access data stored thereon or write data.

If the adhesive 31 is not subjected to a magnetic field suitable to break open the micro-encapsulated spheres, the adhesive will not be completed, and the bond strength of the first adhesive part will be insufficient to prevent the peninsula 32, at least in part under the influence of the counterweight 30, from being forced to the outside (away from hole 12) when the disk is spun. FIG. 3 illustrates the orientation of the peninsula 32 if the peninsula is not locked sufficiently while being spun. The peninsula 32 bends away from hole 12 in the direction of arrow 41 and toward edge 27. As a result, the optical storage medium 10 becomes unbalanced which generally prevents a laser from accurately tracking the storage medium thereby rendering the optical data storage medium unusable for reading the data stored thereon or for writing new data to the storage medium. Consequently, stealing such a storage medium is pointless.

In at least some embodiments, the magnetic field suitable for rupturing the spheres encapsulating the adhesive part comprises a magnetic field having a field strength in the range of 100 to 10,000 Gauss and a frequency in the range of 50 to 10,000 Hz. Other magnetic fields are possible as well.

In some embodiments, each part of the adhesive, along with metal filings, is provided in micro-encapsulated form. Thus, a first group of spheres contains one part of the adhesive and a second group of spheres contains the other part of the adhesive. Both groups of spheres are provided in region 24 in the security mechanism. Upon exposure to the resonant magnetic field, both groups of spheres rupture releasing their adhesive parts thereby creating the complete adhesive to lock the peninsula 32 in place.

In various embodiments, a colored dye (e.g., green) is included within at least some of the spheres. The release of the dye upon rupturing of the spheres causes the color of the region 24 to change thereby providing a visual indicator to a person that the peninsula 32 has been locked and the optical storage medium 10 is ready for proper use.

Figure 4:
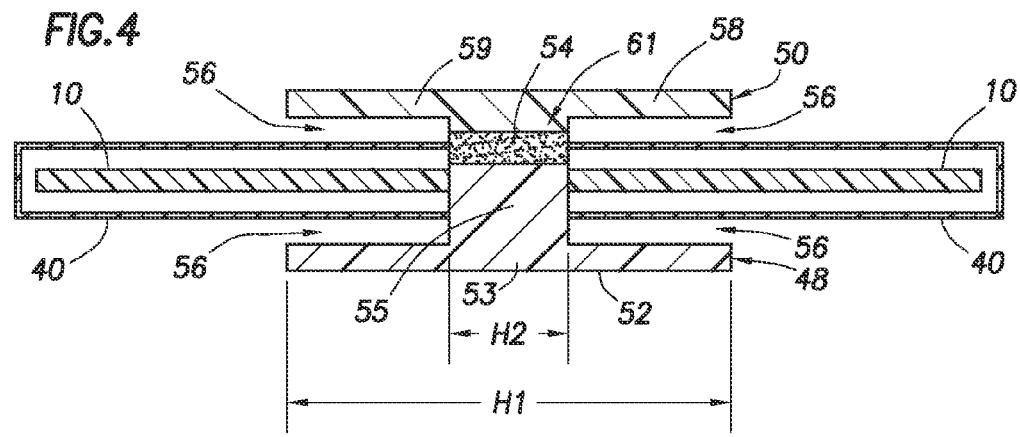
FIG. 4 illustrates a security mechanism comprising two portions locked together by way of an adhesive in accordance with various embodiments.

FIG. 4 illustrates another embodiment of a security mechanism. FIG. 4 is a cross-sectional side view of the optical storage medium 10 provided inside of a case 40 (e.g., a plastic case in which the storage medium 10 is shipped and sold). In this embodiment, the case 40 contains a hole that generally aligns with the hole 12 of the optical storage medium 10 when the storage medium is placed in the case. The security mechanism in the embodiment of FIG. 4 comprises a first portion 52 that is insertable into the center hole 12 of the optical storage medium 10. The security mechanism also comprises a second portion 50 that is lockable to the first portion 52 via an adhesive 54.

The first portion 52 comprises a cap 53 and center post 55 that extends at least partially into the hole 12 of the storage medium, as well as the corresponding hole of the case 40. The diameter H1 of the cap 53 is larger than the diameter H2 of the hole. The second portion 50 also comprises a cap 59 that has a diameter larger than the diameter H2 of the hole. The second portion 50 may also comprise a center post 61 and, in some embodiments, center post 61 may also extend at least partially into the hole 12. The two portions 50 and 52 are brought together from opposite sides of the rotating storage medium 10 and locked together using an adhesive 54. The adhesive has a bond strength sufficiently great to prevent the two portions 50 and 52 from being pulled apart without damaging the rotating storage medium which would render the storage medium unusable for accessing data stored thereon. Further, even if the security mechanism of FIG. 4 is attached just to the optical storage medium 10 and not also to the case 40, the optical storage medium 10 cannot be installed into a computer or other player because of the presence of the security mechanism. Consequently, the optical storage medium 10 cannot be used with the security mechanism in place and forced removal of the security mechanism will damage the storage medium.

The adhesive 54 used in the security mechanism of FIG. 4 comprises micro-encapsulated dissolvent. The micro-encapsulated dissolvent is suitable for sufficiently reducing the bond strength of the adhesive 54 to thereby enable the two portions of the security mechanism to be pulled apart without damaging the optical storage medium. In some embodiments, the dissolvent is one of, or a mixture of two or more of, acetone, xylene and alcohol. Metal filings are also included within the micro-encapsulated dissolvent. In the presence of a suitable magnetic field, the metal filings resonate thereby rupturing the spheres containing the dissolvent. Once released, the dissolvent reacts with the adhesive to reduce the adhesive's bond strength. In some embodiments, the magnetic field suitable for rupturing the spheres encapsulating the dissolvent comprises a magnetic field having a field strength in the range of 100 to 10,000 Gauss and a frequency in the range of 50 to 10,000 Hz. Other magnetic fields are possible as well. The magnetic field can be applied, for example, at the point-of-sale which permits the security mechanism to be removed from the storage medium and its case.

Figure 5:
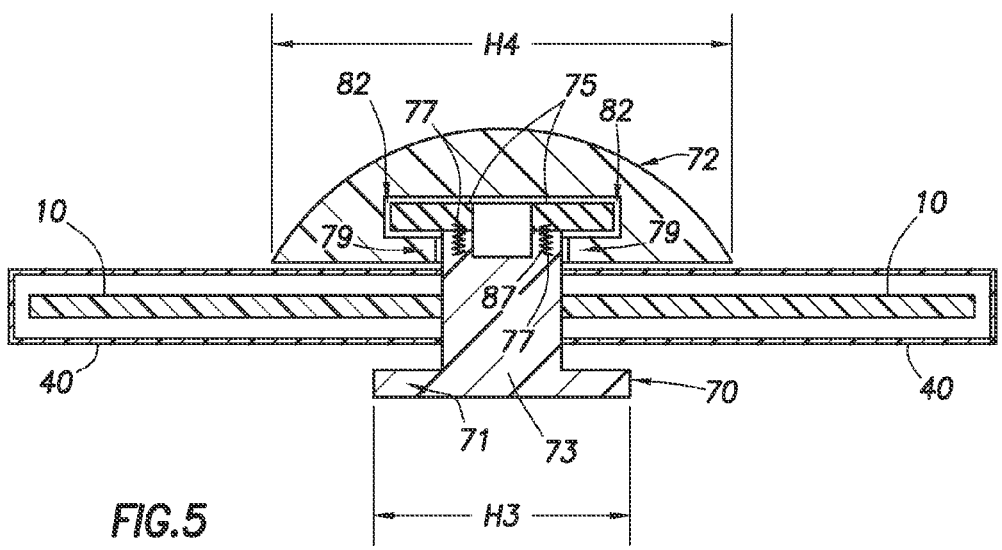
FIGS. 5 and 6 illustrate another security mechanism comprising two portions locked together by way of rotating members in accordance with various embodiments.
Figure 6:
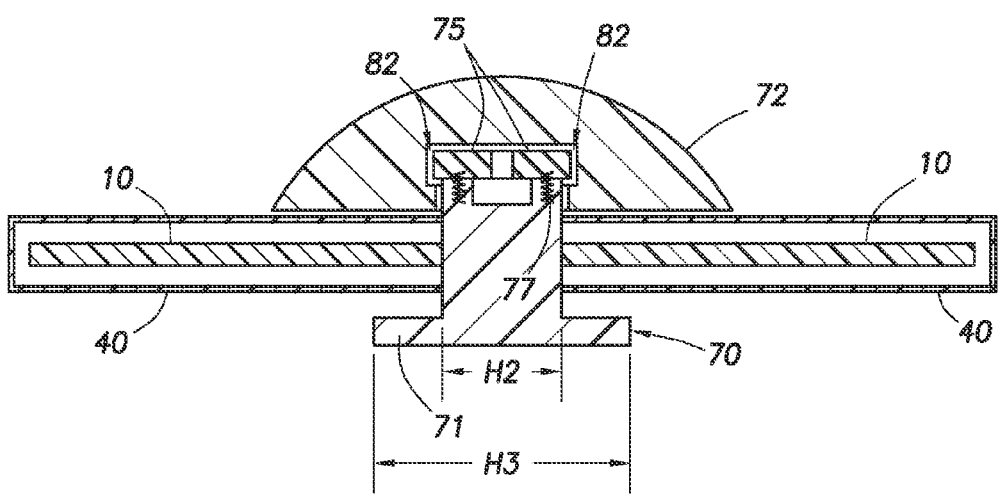

FIGS. 5 and 6 illustrate another embodiment of a security mechanism. The embodiment of FIGS. 5 and 6 is similar to that of FIG. 4 in that the security mechanism comprises a first portion 70 and a second portion 72 that lock together in the hole of the rotating storage medium. The first portion 70 comprises a cap 71 that has a diameter H3 that is larger than the diameter H2 of the hole 12. A center post 73 extends through the hole 12 to the opposite side of the rotating storage medium. A pair of rotating members 75 are also provided on the first portion 70. Each of the rotating members 75 can be rotated between a first position and a second position. In the first position, the rotating members are rotated outward into a locked position shown in FIG. 5. The second position is illustrated in FIG. 6 in which the rotating members 75 are rotated inward to an unlocked position. A spiral spring 73 is provided with each rotating member 75 in a longitudinal post 85 about which each rotating member 75 rotates. The springs 73 are arranged to force the rotating members 75 into the outward locked position (FIG. 5). The rotating members 75 comprise, for example, ferromagnetic material. As such, the rotating members can be rotated from the first (locked) to the second (unlocked) position in the presence of a suitable and appropriately directionally-oriented magnetic field. Upon removal of the magnetic field, the springs 77 cause the rotating members 75 to rotate outward to the locked position. The magnetic field has a strength sufficient to overcome the strength of the springs 77.

The second portion 72 is curved in some embodiments, such as that shown in FIGS. 5 and 6, but can be of any shape. The diameter H4 of the second portion 72 is larger than the diameter H2 of the hole 12.

To attach the security mechanism of FIGS. 5 and 6, a magnetic field applied to the portion 70. The magnetic field forces the rotating members 75 to rotate inward. The case 40 containing the optical storage medium 10, or just the optical storage medium, is positioned over the portion 70 such that post 73 extends upward through hole 12. The second portion 72 is then placed over the rotating members 75. The second portion 72 comprises inwardly protruding surfaces 79 which define a cavity 82. The magnetic field is then removed which causes the rotating members, under the influence of springs 77, to rotate outward into the cavity 82 to the locked position as shown in FIG. 5. The optical storage medium 10 and case 40 are locked at this point. The second portion 72 cannot be removed without damaging the storage medium thereby rendering the storage medium unusable for storing and reading data.

At the POS, application of the magnetic field causes the rotating members 75 to rotate inward against the force of the springs 77 to the unlocked position (FIG. 6). The second portion 72 can then be removed. With the rotating members still rotated inward, the case 40 is separated from the first portion 70.

In some embodiments, the magnetic field is customized for use at the POS in such a way that it cannot be readily replicated. In some embodiments, the magnetic field strength as well as temporal criteria may be configured for the particular magnetic field usable to lock and unlock the rotating members 75. For example, magnetic field strength of a certain amplitude alone or in combination with spatial and temporal characteristics function to provide for mechanism lock/unlock.

Figure 7:
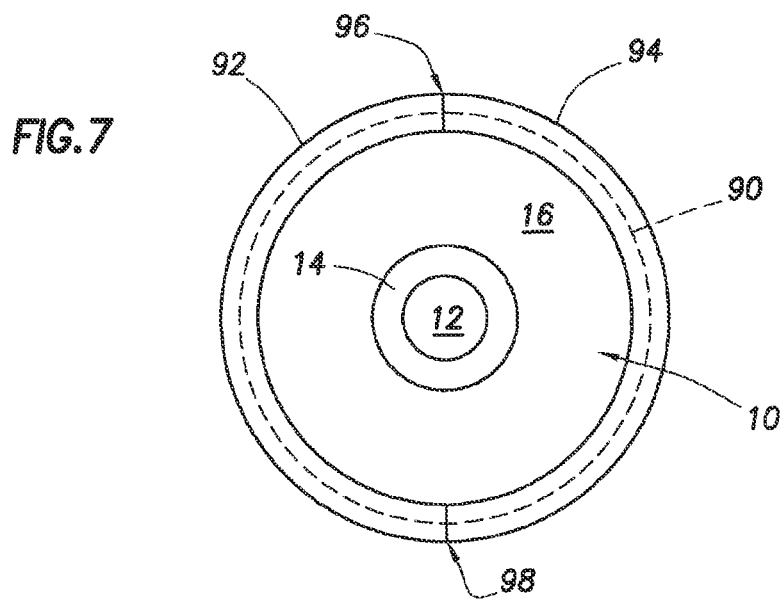
FIG. 7 illustrates a yet another security mechanism comprising a pair of curved portions that fit about an outer edge of the optical storage medium.
Figure 8:
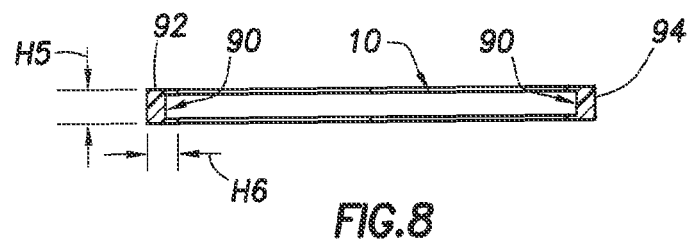
FIG. 8 shows a cross-sectional side view of the security mechanism of FIG. 7.
Figure 9:
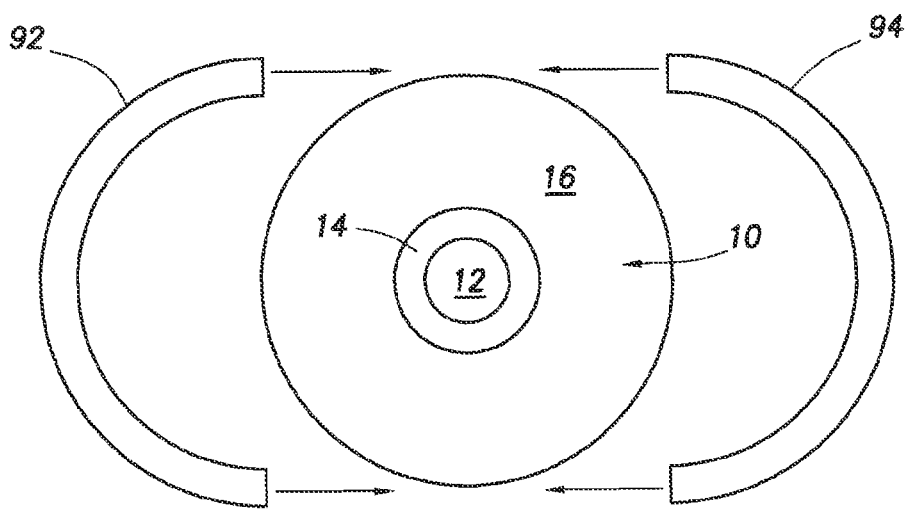
FIG. 9 illustrates the curved portions of FIG. 7 in an unlocked configuration.

FIG. 7-9 illustrate an embodiment of a security mechanism in the form of a ring that fits over an outer edge 90 of the optical storage medium 10. The ring is provided in two curved portions 92 and 94 as illustrated in FIGS. 7 and 9. The two curved portions 92 and 94 are positioned over the outer edge 90 of the storage medium and glued together using adhesive 96 and 98.

Each curved portion fits over edge 90 over approximately one-half the circumference of the optical storage medium 10. FIG. 8 shows a cross-sectional side view of the storage medium 10 with the curved portions 92 and 94 in place over edge 90. The curved portions 92 and 94 comprise, for example, plastic or metal.

With the curved portions 92 and 94 locked in place on the optical storage medium 10, the storage medium cannot be used. In some embodiments, the height H5 or the depth H6 of the curved portions 92, 94 are such that the storage medium will not fit into a computer or other media player. In other embodiments, even if the storage medium 10 can be inserted into a player, the added weight of the curved portions 92 and 94 prevents the optical storage medium from spinning at a correct rate for the content stored thereon to be read or for writing data to the medium.

The adhesive 96 and 98 used to lock the curved portions 92 and 94 together comprise a micro-encapsulated dissolvent such as that described above. Thus, at the point of sale, the micro-encapsulated dissolvent is released upon exposure to a magnetic field thereby sufficiently reducing the bond strength of the adhesive so that the two curved portions 92, 94 can be pulled apart rendering the optical storage medium usable.

In some embodiments, the optical storage medium 10 resides within a generally circular case and the curved portions 92 and 94 fit over the outer edge of the case. In other embodiments, the curved portions 92 and 94 fit over the outer edge 90 of the optical storage medium and the optical storage medium 10 is contained within a case. A colored dye (see above) is included with the dissolvent and, if at least a portion of the case is transparent, the change of color provides a visual indication that the dissolvent has been released. Once the purchaser opens the case, the purchaser can easily remove the curved portions.

In accordance with yet another embodiment, all or part of the optical storage medium 10 is covered with an absorber, thereby preventing the optical storage medium in the area so coated from being accessed (e.g., reads or writes). The area may comprise an identification area of the storage medium. The identification area comprises data that provides data readable at POS such as laser amplitude, and wavelength or modulation frequency for reversal of the effects of the absorber layer. The coating comprises a photosensitive material in some embodiments such as an absorber that is deactivated at the POS via a light source such as LASER tuned to the "photo bleaching" frequency of the dye. A photoactive material of the absorber includes a dye that is bleached upon irradiation with a suitable beam of light of a particular wavelength. One example of the class of dyes usable in this regard comprises polymethine dyes, particularly indocyanine green, available from Aldrich Chemical Co., Milwaukee, Wis. The absorption wavelength of the dye generally matches the read radiation frequency band. In some embodiments, for example, the absorber absorbs in wavelength band of radiation of 780+/−40 nm. Other suitable dyes comprise dyes of the indocyanine class with CAS# numbers 212964-63-1, CAS#205744-92-9, 256520-09-9, 269401-43-6, available form FEW Chemicals GMBH, Wolfen, Germany. Such dyes are bleached with a LASER light having a wavelength in range of 400-450 nm and a power of 10-50 mw focused to a 20 micron spot diameter. In case of DVDs, where the read radiation frequencies are in the 650 nm band, CAS#514-73-8; CAS#172491-72-4, CAS#131443-20-4 dyes, all available form FEW Chemicals GMBH, Wolfen, Germany, are used to block all or part of the storage medium coated with such a dye.

In some cases a mixture of various dyes is used to block off the readability of the coated portion. The dye mixtures comprise a solvent, such as isoprpopanol or octafluoropentanol, and a binder, such as polyvinyl bytryal or acylate.

Although cyanine dyes are described here, a variety of classes of dyes such as diazo, fluoran, ployene, anthocyanine, falavonid, indigo, curcumins, can be used as well to block the coated areas of the optical storage medium 10, and can be bleached to expose such areas to make the storage medium readable.

FIG. 10 illustrates a method 100 applicable to some or all of the embodiments described above. At 108, the method 100 comprises attaching a first portion of a security mechanism to the optical storage medium 10. At 110, the method comprises locking a second portion of a security mechanism to the first portion thereby rendering the optical storage medium unusable.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus, comprising:
an optical data storage medium comprising a longitudinal portion at a resting location;
a counterweight attached to the longitudinal portion of said optical data storage medium; and
a locking mechanism;
wherein, unless said longitudinal portion is locked in place by said locking mechanism, said counterweight causes said longitudinal portion to move from said resting location when said optical data storage medium is rotated thereby rendering at least some data on said optical data storage medium unusable.

2. The apparatus of claim 1 wherein said locking mechanism comprises a micro-encapsulated adhesive.

3. The apparatus of claim 2 wherein the micro-encapsulated adhesive that includes a colored dye.

4. The apparatus of claim 1 wherein said locking mechanism comprises a multi-part adhesive with each part being micro-encapsulated.

5. The apparatus of claim 1 wherein said longitudinal portion is located in a region of said optical data storage medium that does not contain data.

6. The apparatus of claim 1 wherein the longitudinal portion attaches to the optical storage medium by way of a connecting region, and the locking mechanism comprises an adhesive location at a side of the longitudinal portion opposite the connecting region.

* * * * *